United States Patent [19]

Drew

[11] Patent Number: 5,094,033
[45] Date of Patent: Mar. 10, 1992

[54] SEED GERMINATOR

[76] Inventor: Richard G. Drew, P. O. Box 995, Griffith, New South Wales 2680, Australia

[21] Appl. No.: 505,711

[22] Filed: Apr. 5, 1990

[30] Foreign Application Priority Data

Aug. 14, 1989 [AU] Australia .................. PJ5759

[51] Int. Cl.$^5$ .............................................. C12M 1/22
[52] U.S. Cl. ........................................................ 47/69
[58] Field of Search .................. 47/60, 69, 73, 84, 85, 47/17, 66

[56] References Cited

U.S. PATENT DOCUMENTS

| | | | |
|---|---|---|---|
| 757,045 | 4/1904 | Lane | 47/27 |
| 2,123,075 | 7/1938 | Langa | 47/66 |
| 2,932,386 | 4/1960 | Ushkow | 47/66 |
| 4,222,196 | 9/1980 | Pointon | 47/27 |
| 4,495,725 | 1/1985 | Talbott | 47/85 |
| 4,931,329 | 6/1990 | Sun | 47/69 |

Primary Examiner—David A. Scherbel
Assistant Examiner—Michele A. Van Patten
Attorney, Agent, or Firm—Hopgood, Calimafde, Kalil, Blaustein & Judlowe

[57] ABSTRACT

A seed germination unit is provided comprising at least one lower soil retention unit in which the seed can be placed. The unit includes a transparent or translucent upper covering unit adapted to be located above the lower soil retention unit. The upper covering has a depression located in its top surface with a small hole at the lowest point of the depression so as to allow liquid placed within the depression to drip through the small hole and fall into the soil retention unit.

7 Claims, 2 Drawing Sheets

SEED GERMINATOR

The present invention relates to an improved seed germination unit and, in particular, to a germination unit which contains individual cells for each seed to be germinated.

In existing seed germinators there are problems associated in ensuring an adequate moisture content of the soil or potting mixture without drowning the seedling or seed, while at the same time, allowing for ease of removal of the seedling when it is adequately matured, and exclusion of insect and animal pests.

An existing growing container for seeds is shown in U.S. Pat. No. 3,314,194, in the name of Halleck. This device comprises a receptacle for plants having an inner and outer waterproof container with a layer of moisture absorbent material, therebetween, which acts as a water reservoir. The container is then sealed with a water-impervious cover.

The seedling is difficult to remove from the substantially rigid base and there is no provision for the exclusion of insect pests as the Halleck container has an opening of from ½ to 2 inches in diameter in the top of the container.

U.S. Pat. No. 4,286,408 in the name of J. Manno discloses a structure which is non-portable and is made to be partially buried in the soil, with the lower "seed pan" having holes therein to allow water to rise therethrough. Further, the "seed pan" is constructed of disintegrating material. The cover does have a drip edge to trap moisture rising from the plants as condensate and drip back into the plants. This device is used for in situ growing and is not suitable for a germination unit.

U.S. Pat. No. 4,291,494 in the name of D. J. Knablein et al discloses an "indoor greenhouse" which is not suitable for a seed germinator due to the difficulty in removal of the seedlings from the container, nor does it have a shaped closure for automatic watering.

The present invention provides a seed germination unit comprising:

at least one lower soil retention unit or container in which the seed can be placed; and a transparent or translucent upper covering unit or cover adopted to be located above the lower soil retention unit, said upper covering unit having a depression located in its top surface with a small hole at the lowest point of the depression so as to allow liquid placed within the depression to drip through the small hole to fall into the soil retention unit.

Preferably the upper covering unit has side walls which prevent access to the seedling by external agents such as wind, mice, insects, or the like.

The present invention will now be described by way of example with reference to the accompanying drawings in which.

Figure 1:
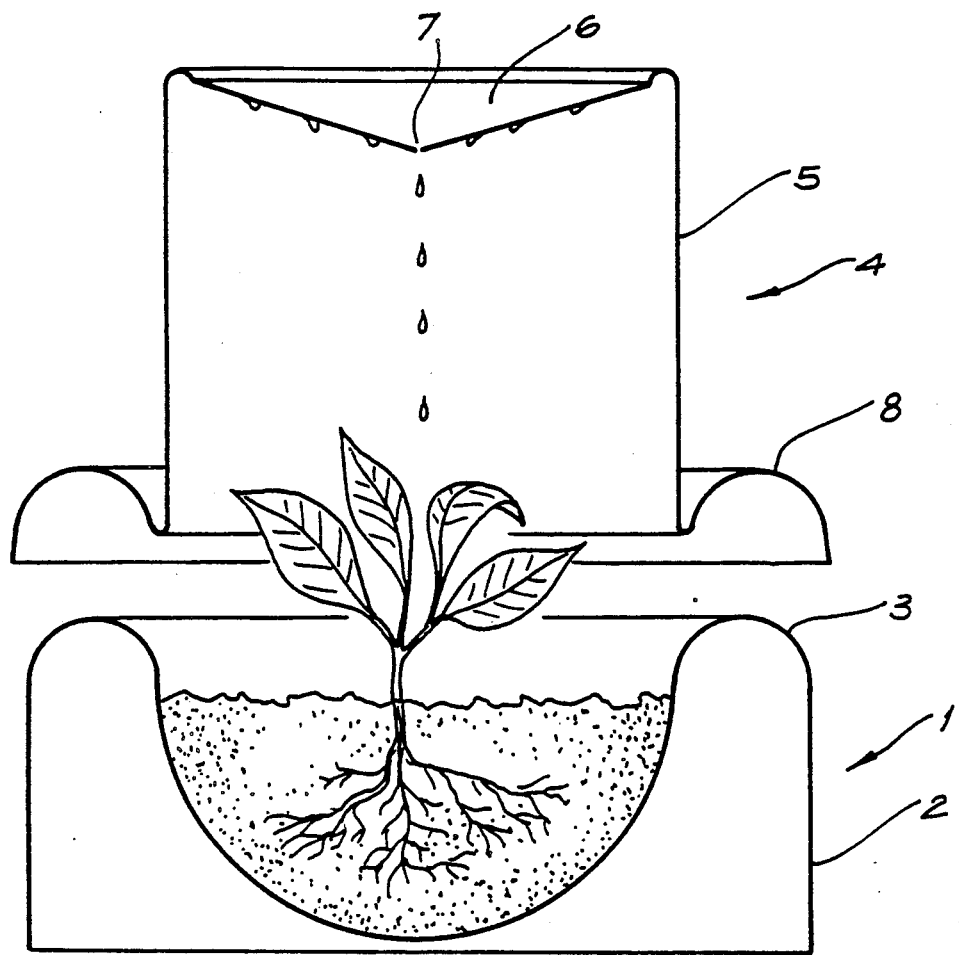
FIG. 1 illustrates one form of the invention with the upper unit being placed in position on the lower unit.

A preferred embodiment of the present invention is illustrated in FIG. 1 illustrating a single unit device. Potting mixture, or the like, is placed in a lower soil retention unit 1 which is so shaped as to allow ease of removal of the soil and the seedling together without disturbance to the roots of the seedling. Advantageously, the single cell soil retention unit comprises a concave depression or cavity which is substantially hemispherical in shape and preferable less than hemispherical in shape. The cavity is surrounded by a peripheral positioning means, or lips, e.g. 3, which in one embodiment is convexed.

The soil retention unit 1, as shown in FIG. 1, is of a thin walled plastics material having cylindrical side walls 2 and an annular upper support surface 3 or lip having a convex shape. This unit can be made of any suitable material such as resilient plastics. The upper covering unit 4, as shown, comprises a cylindrical wall section 5 with an upper well unit 6 having a hole 7 located in the lowest point of the well. The upper covering 4 also has a peripheral positioning means or support means 8 which engages or mates with the complementary upper support surface 3 of the soil retention unit 1. Preferably the peripheral positioning means or support means 8 is annular in shape and may be concaved to mate intimately with the upper support surface 3 of the soil retention unit which may be convexed in order to prevent ingress by insects, or the like to the seed or seedling. Concave/convexed mating of the peripheral edges or lips of the cover and container is preferred.

In use, water is placed in the well 6 which trickles through the small pin hole 7 to supply moisture to the seed. Preferably the upper covering 4 and the soil retention unit form a closed environment whereby moisture which leaves the plant by transpiration, or the soil by evaporation, condenses on the underside of the well 6 and runs down the well's tapered surface to drip back onto the plant. The use of such a system allows for the placing of fungicides or fertilisers into the well to allow for addition to the seedling or seed. As the upper covering 4 is transparent or translucent the plant would obtain its required amount of sunlight, whilst being protected from wind, insects, small animals such as mice, and the like.

Figure 2:
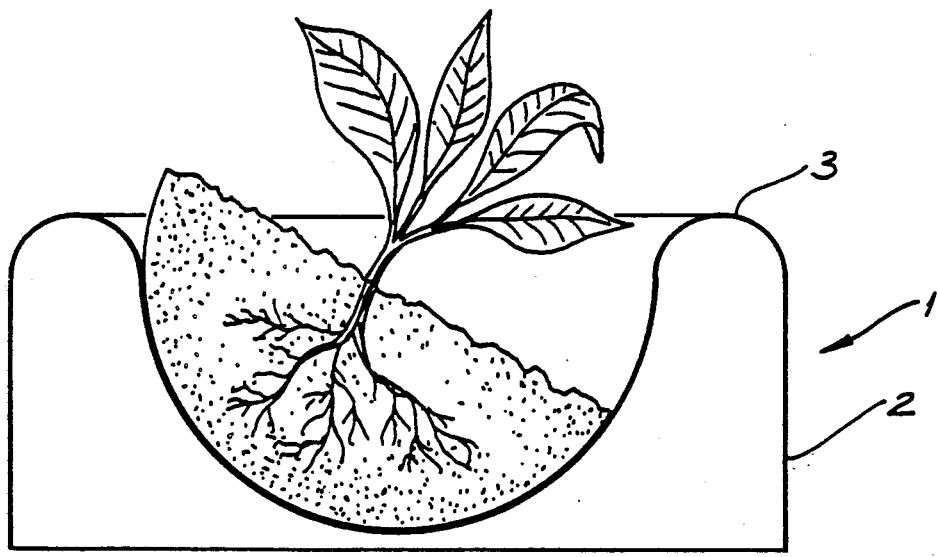
FIG. 2 illustrates the removal of a seedling from the lower soil retention unit.

As shown in FIG. 2, it is a simple matter to remove the now grown seedling and associated potting mixture from the soil retention unit 1, without disturbing the roots of the seedling, by flexing the walls of the soil retention unit and moving the potting mixture as a unit by sliding it along the curved surface of the depression as illustrated in FIG. 2 and thereby allow easy removal of the seedling and its accompanying soil.

The soil retention unit can be made of solid material or made of flexible thin material, depending on the requirements of the user.

Figure 3:
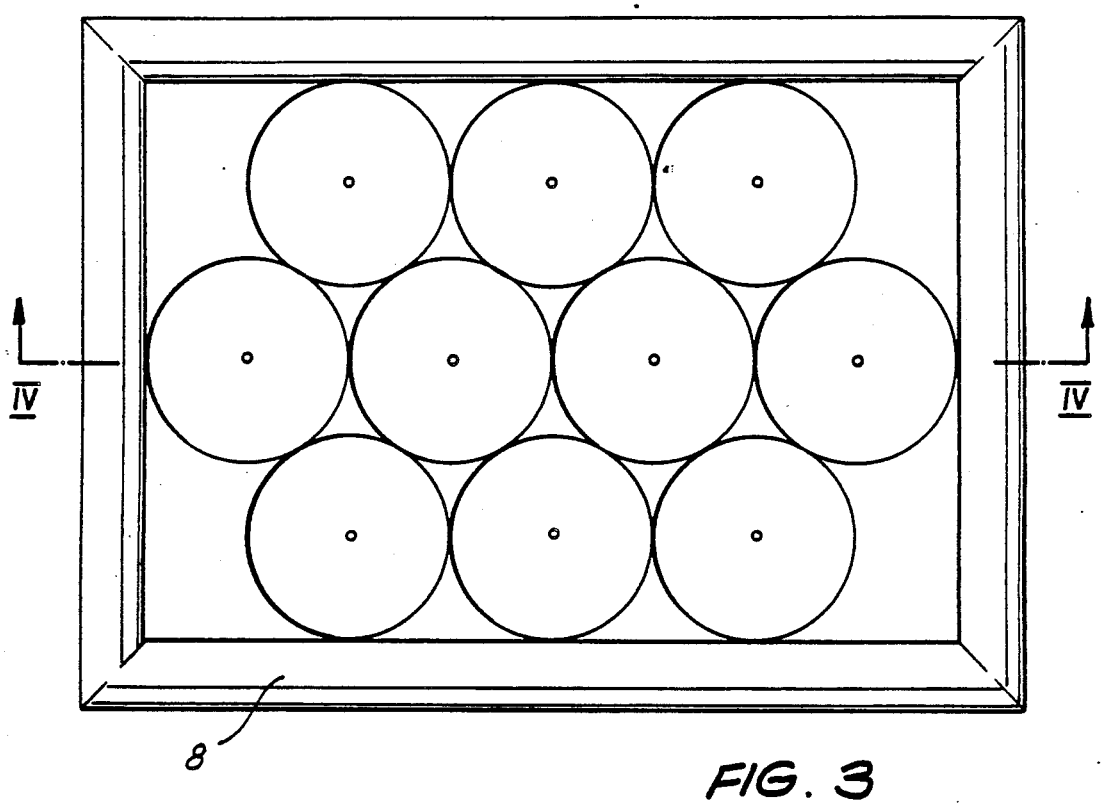
FIG. 3 illustrates a plain view of one embodiment of the present invention illustrating a multiple unit germinator box.
Figure 4:
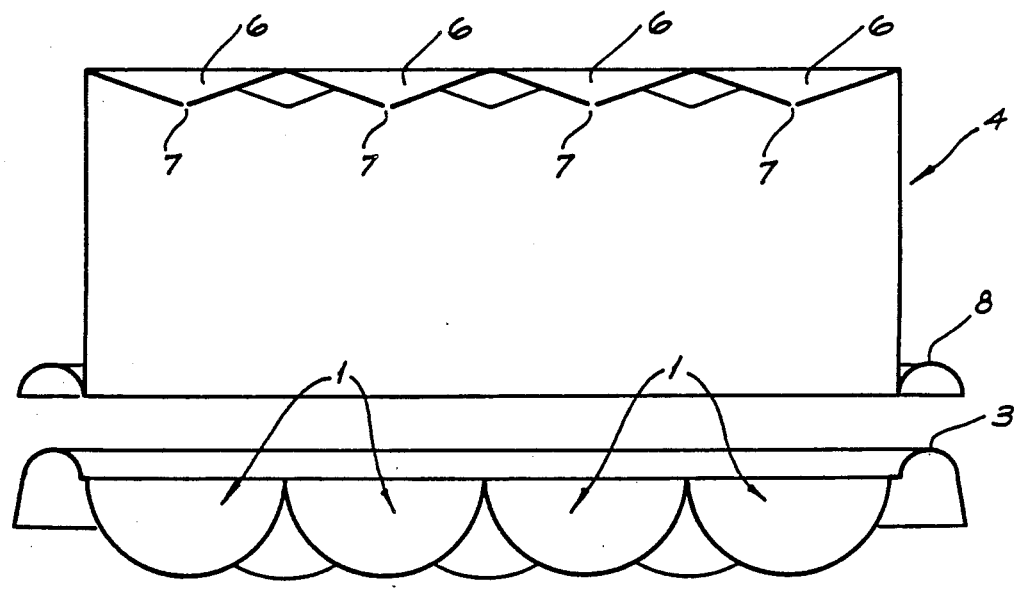
FIG. 4 illustrates a sectional view of the embodiment shown in FIG. 3.

The multi cell multicompartmented construction is shown in FIGS. 3 and 4 in which the support means 8 is rectangular in shape and mates with the complementary upper support surface 3 of the soil retention units 1. Located above each soil retention units 1 is a corresponding well 6 with its respective hole 7. Thus when the upper covering 4 is located in place above the soil retention units 1, a self-contained environment for all units is obtained.

The number of units to be used in a multi cell germinator would depend upon requirements of the user and the strength of the plastics material. The wells can be of any suitable shape either concave, conical, pyramidical or any such shape. The terms wells or depression are meant to cover all of these shapes. Further each well could have multiple holes each located at a lower position such that the well has 3 or 4 lower points.

It should be obvious to people skilled in the art that modifications and variations can be made to the above described seed germination unit without departing from the spirit and scope of the present invention.

I claim:

1. A seed germinator comprising:

at least one soil container for receiving the seed and soil or growing medium and at least one cover for attachment to said container, said container having a curved cavity for retaining soil or growing medium therein, said cavity being surrounded by peripheral positioning means at its upper portion for attachment to complementary positioning means on said cover, the configuration of said curved cavity being such that said soil or growing medium with the seedling can be easily and slidably removed as a unit from said container, said cover being made of transparent or translucent material adapted to fit to the upper portion of said container;

said cover having a top surface with a downwardly extending wall section including a well located in the top surface having a small hole located at its lowest point to allow liquid in said well to drip through the hole into the container, the downwardly extending wall section of said cover terminating into peripheral positioning means complementary to the peripheral positioning means of said container, whereby said cover can be fitted to said container via intimate mating of the respective complementary positioning means of said cover and said container.

2. The seed germinator according to claim 1, wherein the seed germinator is a single unit, wherein the wall section of said cover has a cylindrical shape, and wherein the curved cavity of said container has a substantially hemispherical shape.

3. A seed germinator comprising:

a soil container made of thin walled plastic material having a curved cavity therein for receiving a growing medium including a seed, and a cover therefor, said cavity being surrounded by a peripheral positioning lip for attachment to said cover, said cover being made of a transparent or translucent material and comprising a top surface with a downwardly extending wall section terminating into a peripheral positioning lip complementary to said positioning lip of said container for sealingly attaching said cover to said container via said complementary lips, the top surface of said cover including a well with a small hole located at its lowest point to allow liquid to drip through the hole into the container, the configuration of said curved cavity being such that said growing medium and its seedling can be easily and slidably removed from said container.

4. The seed germinator as in claim 3, wherein said curved cavity is substantial hemispherical in shape.

5. The seed germinator as in claim 3, wherein the wall section of said cover is cylindrical in shape.

6. A multicompartmented seed germinator comprising:

a multicompartmented container with a plurality of spaced curved cavities for retaining a growing medium therein including seedlings, a multicompartmented transparent or translucent cover for covering said container in which each compartment is matched with a corresponding cavity compartment of said container when said cover is placed upon said container, a peripheral positioning means surrounding said container, a complementary peripheral positioning means surrounding said cover such that when said multicompartmented cover is placed on top of said multicompartmented container, said positioning means mate one with the other to attach said container and said cover together, each of said compartments of said cover comprising a top surface in the form of a well each having a small hole at its lowest point to allow liquid to drip through said hole to a cavity in a corresponding compartment of the container, the configuration of the curved cavities in the compartmental container being such that the seedlings can be easily and slidably removed from each of said cavities.

7. The seed germinator of claim 6, wherein each of said cavities in said compartmented container is substantially hemispherical.

* * * * *